2,795,495

NON-CAKING AMMONIUM SULFATE NITRATE

Adolf Schmatloch, Oberhausen, Rhineland, and Franz Schaub and Walter Schuff, Oberhausen-Holten, Germany, assignors to Ruhrchemie Aktiengesellschaft, Oberhausen-Holten, Germany, a corporation of Germany No Drawing. Application October 20, 1954,
Serial No. 463,595

Claims priority, application Germany October 24, 1953

7 Claims. (Cl. 71—59)

This invention relates to non-caking ammonium sulfate nitrate.

The use of ammonium sulfate nitrate as a fertilizer is well known. This fertilizer generally consists of about 40% of ammonium nitrate and about 60% ammonium sulfate. As is the case with many other ammonium nitrate-containing fertilizers, the ammonium sulfate nitrate fertilizer has the disadvantage of caking and losing its ability to be spread.

In order to avoid these disadvantages, it is known to add small amounts of iron sulfate or other soluble iron salts to the hot, weakly acid ammonium sulfate nitrate melt. After the melt has been set and granulated, the iron salt is precipitated in the form of iron hydroxide by spraying with an aqueous ammonia solution. The precipitated iron hydroxide prevents or considerably reduces the caking of the ammonium sulfate nitrate.

Iron-free ammonium sulfate nitrate has also been sprayed with iron hydroxide suspensions or with weakly alkaline iron nitrate solutions, instead of being mixed with the iron salt. For this purpose, colloidal solutions of iron hydroxide as are formed in the alkaline precipitation of iron salt solutions, such as iron nitrate solutions, have been used.

In the prior known processes for incorporating the iron hydroxide, the finished ammonium sulfate nitrate is treated with undesirable quantities of water which are added, such as by spraying after the production of the fertilizer, either when precipitating the iron hydroxide or when soaking the fertilizer with the colloidal iron hydroxide solutions. This water substantially reduces the hardness of the salt grains and favors the caking of the material or a later disintegration of the grains which likewise results in caking. These disadvantages may only be avoided by subsequently drying the fertilizer to a content of about 0.1% $H_2O$. Such subsequent drying of the fertilizer is, however, troublesome and relatively expensive.

One object of this invention is a non-caking ammonium sulfate nitrate fertilizer without the above mentioned disadvantages. This, and still further objects, will become apparent from the following description:

The ammonium sulfate nitrate particles in accordance with the invention have precipitated iron hydroxides and/or iron oxides at their surface while their interiors are substantially free from such precipitated hydroxides and oxides.

The ammonium sulfate nitrate in accordance with the invention is capable of being stored and retains free-flowing properties without subsequent drying.

In accordance with the invention, granulated ammonium sulfate nitrate which contains iron salt such as iron sulfate is contacted with gaseous ammonia which causes a precipitation of the iron hydroxides or iron oxides substantially only at the surface of the salt grains. Any water-soluble iron salt is suited for this purpose. Preferable for commercial operation are ferrous chloride, ferric chloride, ferrous sulfate, ferric sulfate, ferrous nitrate and ferric nitrate. The quantity added of the soluble iron salt is selected so that the finished ammonium sulfate nitrate contains 0.4–0.7% of $Fe_2O_3$, calculated as oxide. From this amount, about 0.1–0.2% $Fe_2O_3$ are precipitated, in accordance with the invention, on the surface of the ammonium sulfate nitrate grains by the action of gaseous ammonia. It has been found preferable to treat the iron salt-containing granulated ammonium sulfate nitrate with gaseous ammonia and water vapor. In this mode of operation, the amounts of ammonia and water vapor acting on the fertilizer are proportioned so as to precipitate a thin layer of iron hydrate only on the surface of the salt grains.

In the process of the invention, the precipitation of $Fe_2O_3$ on the surface of the ammonium sulfate nitrate grains is effected by a treatment with gaseous ammonia at atmospheric pressure and at about normal temperature. The quantity of $NH_3$ gas required for this purpose is dependent upon the intensity desired of the brown color which is to be obtained by precipitation of $Fe_2O_3$ on the surface of the ammonium sulfate nitrate grains. Sufficient $NH_3$ gas is generally used as is required for the precipitation of about 0.1–0.2% $Fe_2O_3$ from the iron salt added and especially from iron sulfate. Water vapor in amount of 0.1–0.2% is simultaneously admitted with the $NH_3$ gas. Under these conditions, no additional water is absorbed by the ammonium sulfate nitrate grains which, after granulation and drying, contain about 0.05 to 0.15% of $H_2O$.

The quantities required of $NH_3$ and $H_2O$ result from the following equations:

(a) $Fe_2(SO_4)_3 + 6NH_3 + 6H_2O =$

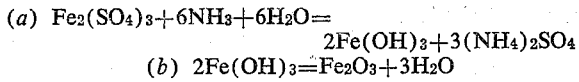

$$2Fe(OH)_3 + 3(NH_4)_2SO_4$$

(b) $2Fe(OH)_3 = Fe_2O_3 + 3H_2O$

Since the granular ammonium sulfate nitrate, prior to being treated with gaseous ammonia, is somewhat acid and has a pH value of 2–4.5, it is advisable to use a quantity of $NH_3$ gas which is somewhat in excess of the figures given above.

Under these conditions, only so much moisture is condensed on the surface of the salt grains as is required for the formation of the iron hydroxides. The surface of the salt grains becomes covered with a weakly brown color, while the interior of the grains remains white or uncolored and contains the remainder of the added iron salt in the form of, for example, ferric sulfate.

The granular ammonium sulfate nitrate produced in accordance with the invention exhibits surprising properties in contrast to ammonium sulfate nitrate grains which contain all of the iron as iron hydroxide throughout the grain and are of a brown color in the interior as well as at the surface. The new ammonium sulfate nitrate with the superficial coat of iron hydroxide possesses a much more satisfactory degree of hardness than the previous iron hydroxide-containing ammonium sulfate nitrate grains. The grains of the new ammonium sulfate nitrate are extremely abrasionproof and are not prone to disintegration. The preferred grain size is 1–6 mm.

The outside iron hydroxide or oxide protective layer applied in accordance with the invention is essential for the non-caking properties of the nitrate. In addition, the iron salt present in the interior of the grains, as, for example, in the form of ferric sulfate, adds to the hardness of the grain structure, as may other added materials known per se, such as alumina salts, silicic acid and compounds of silicic acid, as obtained, for example, from decomposed phonolite. The phonolite added contains aluminium sulfate and silicic acid. Instead of phonolite, aluminium sulfate and silicic acid which has been obtained from alkali silicates may directly be used. However, the use of phonolite is particularly advantageous.

The process of the invention exhibits two fundamental advantages for the production of granular ammonium sulfate nitrate. The iron salt added is only precipitated on the surface of the grains in the form of iron hydroxide. This precipitation takes place without the supply of additional moisture because the water vapor used in addition to the gaseous ammonia introduces only so much water into the granular ammonium sulfate nitrate as is necessary for the formation of iron hydroxides. A granular, non-caking ammonium sulfate nitrate of sufficient grain hardness with a brown surface and lasting free-flowing properties is obtained as the finished product.

The performance of the process of the invention may be effected with as such known equipment. For example, the gaseous ammonia and the water vapor added may act upon the granulated ammonium sulfate nitrate in a rotary drum or in a screw conveyor. The throughput of granular fertilizer mass and of the gaseous ammonia-water vapor mixture may be easily adjusted so that the granules of ammonium sulfate nitrate are coated with a thin iron hydroxide layer at the surface only.

The treatment, in accordance with the invention, of granulated ammonium sulfate nitrate may be effected with particular advantage with the use of the device disclosed in German Patent No. 902,955. In this device, the hot granulated salt travels downward over slightly inclined grid surfaces. The treatment may be combined with the cooling of the granulated ammonium sulfate nitrate. For this purpose, the air stream used for the cooling of the ammonium sulfate nitrate grains is mixed with small amounts of gaseous ammonia while small amounts of water vapor from nozzles are passed into the granular ammonium sulfate nitrate as it enters the treating device.

The following example is given by way of illustration and not limitation:

*Example*

A white, weakly acid ammonium sulfate nitrate melt is produced in a saturator by introducing nitric acid, sulfuric acid and gaseous ammonia and adding about 0.8% of phonolite and about 0.8% of iron vitriol (based on the finished fertilizer). While correspondingly cooling, this melt is granulated in a worm followed by a rotary drum. This results in a white granular ammonium sulfate nitrate which contains about 0.4–0.5% of $Fe_2O_3$ in the form of ferric sulfate and about 0.1% and less of free acid. After cooling, the granular material contains still about 0.1% of water. When being stored, it is highly apt to cake.

Gaseous ammonia, in amounts of about 5 kg. $NH_3$ per 6,000 kg. of ammonium sulfate nitrate per hour, and small amounts of water vapor are passed into the rotary drum used for the granulation, and about 0.1% of $Fe_2O_3$ in the form of brown iron hydroxide is precipitated on the surface of the fertilizer grains. Following this, the fertilizer is cooled over grid surfaces through which cold air is passed from below. The thus treated granular ammonium sulfate nitrate, when stored, will unobjectionably retain its free-flowing properties and will no longer be apt to cake.

The gaseous ammonia may also be blown directly into the cold air used on the grid surfaces for cooling the material rather than into the rotary drum. In this case, exactly controlled small amounts of water vapor are applied, through nozzles, to the ammonium sulfate nitrate as it is transferred from the rotary drum to the cooling device.

The ammonium sulfate nitrate prepared in this manner contains an average of—

40–42% $NH_4NO_3$
56–58% $(NH_4)_2SO_4$
1–2% $Fe_2(SO_4)_3$ corresponding to 0.4–0.7% $Fe_2O_3$
About 0.67% $Al_2(SO_4)_3$ corresponding to 0.2% $Al_2O_3$
About 0.1–0.2% $H_2O$
About 0.1–0.2% $SiO_2$.

By the treatment with gaseous ammonia, 0.1–0.2% of $Fe_2O_3$ have been precipitated as a coat on the surface of the ammonium sulfate nitrate grains.

About the following quantities of raw materials are required to produce 6,000 kg. ammonium sulfate nitrate per hour:

4,000 kg. nitric acid (47% $HNO_3$)
3,600 kg. sulfuric acid (75% $H_2SO_4$)
1,200 kg. ammonia
15–80 kg. phonolite
90–150 kg. iron sulfate ($FeSO_4.7H_2O$).

We claim:
1. Process for the production of granular non-caking ammonium sulfate nitrate, which comprises contacting a granulated weakly acid ammonium sulfate nitrate containing an iron salt with gaseous ammonia and recovering ammonium sulfate nitrate salt granules containing a member selected from the group consisting of iron hydroxide, iron oxide and mixtures thereof, precipitated substantially solely at the surface of said ammonium sulfate nitrate granules.

2. Process according to claim 1, in which said iron salt is iron sulfate.

3. Process according to claim 1, in which said gaseous ammonia contains a minor quantity of water vapor.

4. Process according to claim 1, in which said granular ammonium sulfate nitrate additionally contains a hardness-increasing material selected from the group consisting of alumina, silicic acid and easily decomposable silicates.

5. Process according to claim 1, in which said contacting is effected by passing said ammonium sulfate nitrate downwardly and passing said gaseous ammonia admixed with cooling gas upwardly in countercurrent contact therewith.

6. Process according to claim 5, in which the ammonium sulfate nitrate granules are passed downwardly over an inclined gas-permeable grid surface and the gaseous ammonia and cooling gas passed upwardly through said grid surface.

7. Process according to claim 6, which includes contacting the granular ammonium sulfate nitrate with water vapor prior to said contact with said gaseous ammonia.

References Cited in the file of this patent

UNITED STATES PATENTS

| | | |
|---|---|---|
| 1,939,165 | Eissner | Dec. 12, 1933 |
| 1,966,947 | Eyer | July 17, 1934 |
| 2,030,583 | Haas | Feb. 11, 1936 |
| 2,702,747 | Studebaker | Feb. 22, 1955 |
| 2,741,876 | Paoloni | Apr. 17, 1956 |